United States Patent [19]

Lichfield

[11] Patent Number: 4,834,293
[45] Date of Patent: May 30, 1989

[54] SPRAY WAND

[76] Inventor: William H. Lichfield, Box 112, Corinne, Utah 84307

[21] Appl. No.: 172,255

[22] Filed: Mar. 23, 1988

[51] Int. Cl.⁴ .............................................. B05B 9/01
[52] U.S. Cl. .................................. 239/447; 239/526; 239/DIG. 19
[58] Field of Search ............................ 239/443–449, 239/525, 526, 569, 583, 124, DIG. 19; 285/1, 55, 280, 281

[56] References Cited

U.S. PATENT DOCUMENTS

| 3,279,828 | 10/1966 | MacFarland | 285/1 |
| 4,036,259 | 7/1977 | Wilder et al. | 285/1 |
| 4,541,568 | 9/1985 | Lichfield | 239/526 |
| 4,709,859 | 12/1987 | Schulze et al. | 285/281 |

FOREIGN PATENT DOCUMENTS

| 2051169 | 5/1978 | Fed. Rep. of Germany | 285/1 |
| 3148898 | 6/1983 | Fed. Rep. of Germany | 239/443 |
| 435990 | 11/1967 | Switzerland | 239/443 |
| 241925 | 10/1925 | United Kingdom | 285/281 |

Primary Examiner—Andres Kashnikow
Assistant Examiner—Karen B. Merritt
Attorney, Agent, or Firm—B. Deon Criddle

[57] ABSTRACT

A safety spray wand for use in car wash units, and the like, having selected valve units, each with a single moving valve part to provide controlled flow through a valve housing; a break-away, variable length barrel assembly connected to the valve housing and with the housing structure made to withstand even severe vandalism and to accommodate swivel coupling of a supply line to the wand.

12 Claims, 2 Drawing Sheets

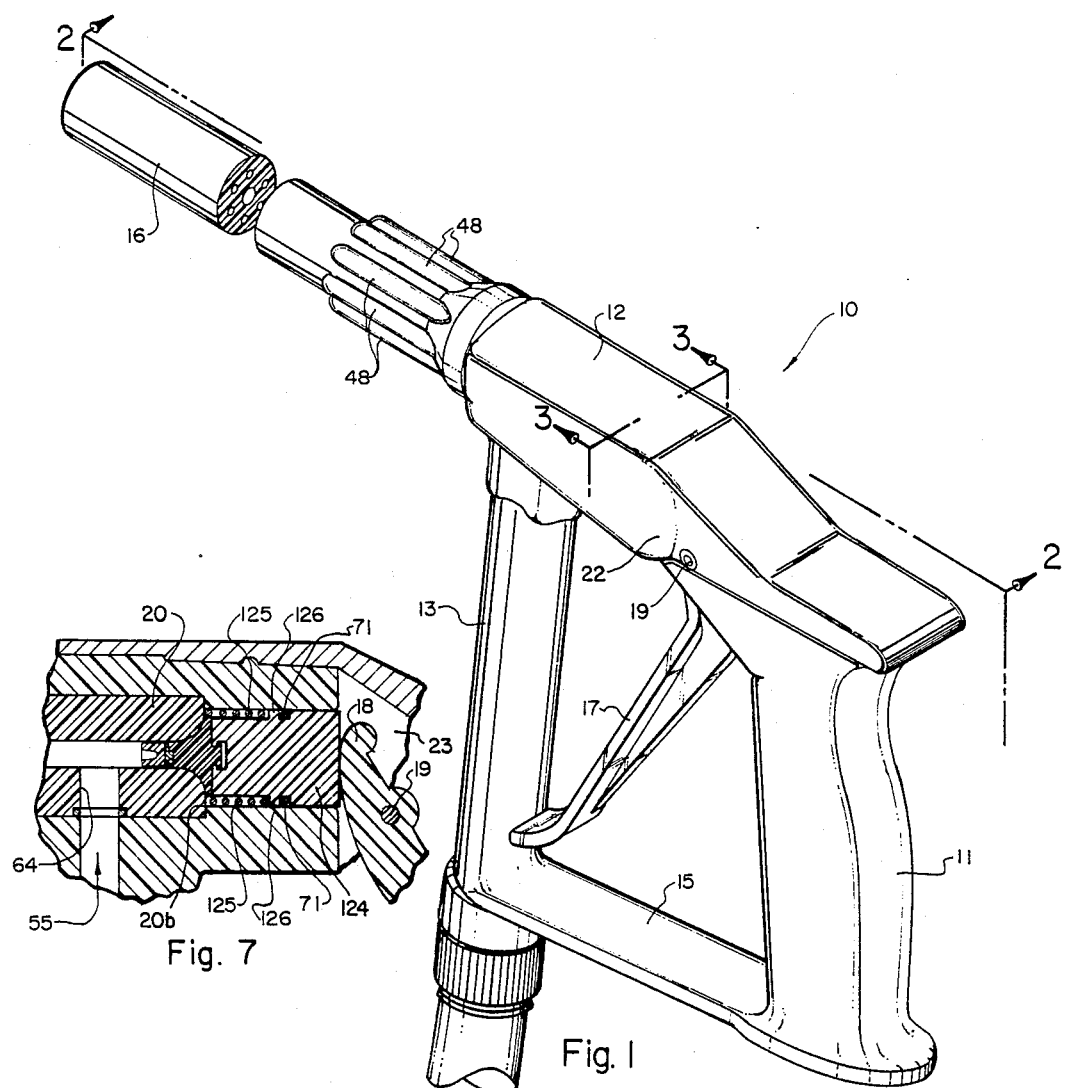

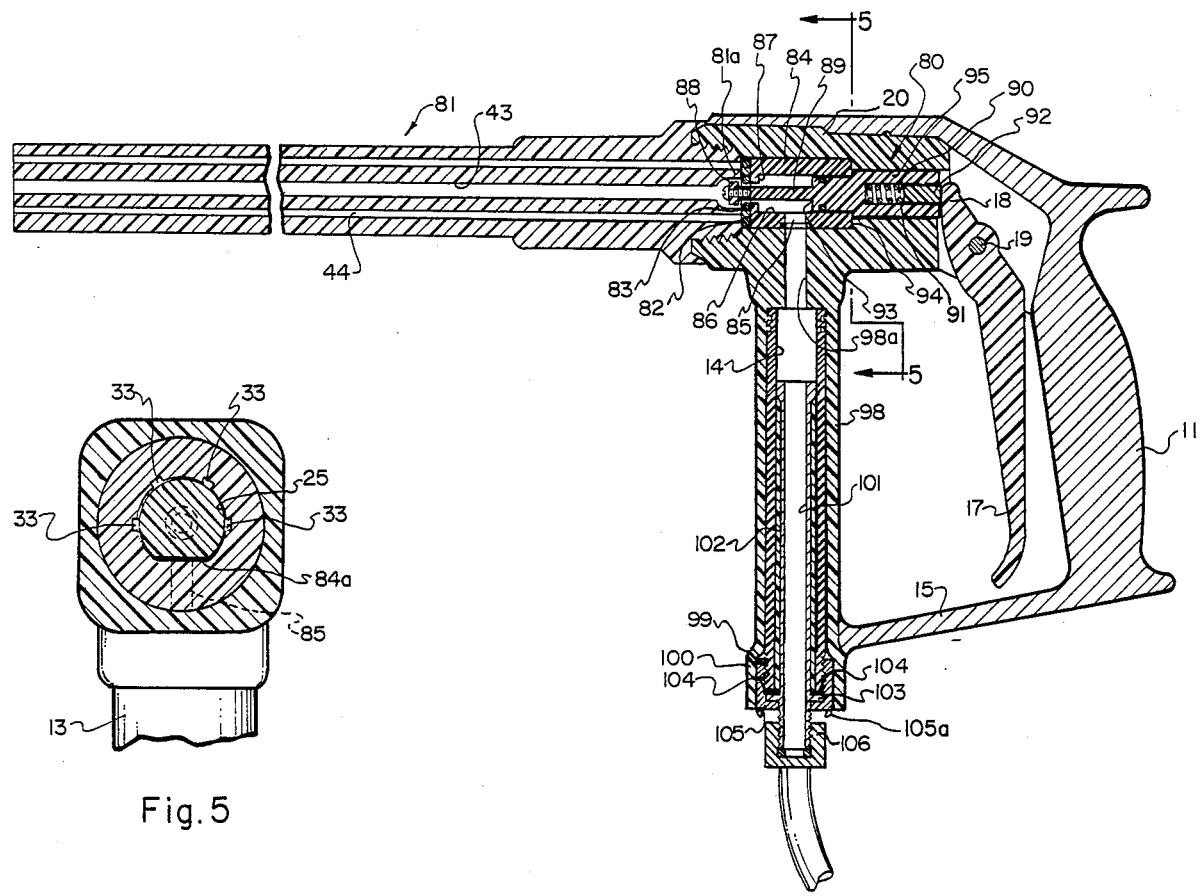
Fig. 5
Fig. 4
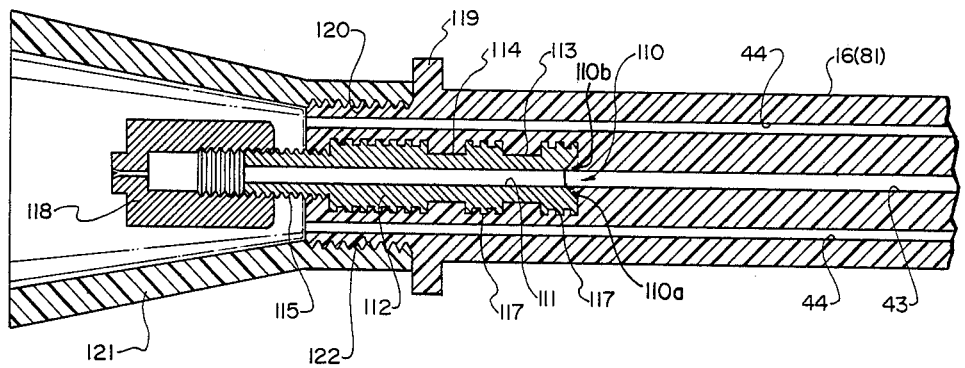
Fig. 6

SPRAY WAND

BRIEF DESCRIPTION

1. Field of the Invention

This invention relates to hand held spray wands that will provide a high pressure discharge from a nozzle or selectively a low pressure discharge and that is particularly adapted to be used in car wash units and the like.

2. Prior Art

The use of hand held spray wands to direct a high pressure spray of water or other cleaning fluid has long been known. Such wands are commonly used, for example, in conjunction with car wash operations and with steam cleaners and the like.

It has been found that many of the known spray wands are sometimes dangerous to users when liquids are being delivered at high pressures through the wands. Originally the wands did not include user operated control valves, but high pressure flow through the wands was initiated by insertion of coins into a coin receptacle. Such wands, on the ends of flexible hoses, tended to whip around and required a great deal of strength on the part of the user. Subsequently, user operated control valves were used to regulate flow through the wands. The valves often wear and then remain open when the wand handle is released by the user so that a jet action may still occur to whip the wand around in a dangerous manner. Such uncontrolled movement of the wand can be dangerous to persons and structures in the vicinity. These prior known wands have also been unnecessarily expensive as a result of the many components used in their construction and, since they often have a thin plastic cover shell and bolted construction, they are easily destroyed by vandals.

More recently, as disclosed in my U.S. Pat. No. 4,541,568, hand held spray wands have been developed that will provide for a low pressure fluid discharge or a high pressure discharge, depending upon the actuation of the control valve for the wand. Also, in my aforementioned U.S. Patent, there is disclosed a safety spray wand that is intended to be durable and not easily destroyed, even by deliberate acts of vandalism.

However, it has been found that even with the car wash wand disclosed in my aforesaid U.S. Patent, persons using the wand are still able to bend the barrel assembly and thereby render the wand inoperable. It has been found, for example, that some people will deliberately place the tip of a wand between a car bumper and other vehicle body parts and then attempt to bend the barrel so that the discharge will curve and can be applied even beneath the carriage structure of the vehicle. Naturally, this deliberate vandalism is very destructive of car wash wands. In addition, people throw the wands and even drive over them with their vehicles.

It has also been determined that when the barrel structure of a safety spray wand of the type shown in my aforementioned patent is bent, the valving structure does not function properly since the valving structure is located at the barrel tip and requires a long rod extending through the barrel from the tip to a trigger at the handle, for operation.

Further, it has been found that where the valve structures of previously known wands are subject to very high pressure water flows the parts wear rapidly and undesired leakage will occur. Also the barrel tips erode and nozzles threaded into the barrel tips may be ejected by the high pressure discharge.

OBJECTS OF THE INVENTION

Accordingly, principal objects of the present invention are to provide a spray wand that is very rugged, durable, and that will withstand even deliberate acts of vandalism.

Another object is to provide a safety spray wand having either a low pressure discharge or a high pressure discharge.

Still other objects are to provide a safety wand that utilizes a minimum number of movable parts; that is easily assembled; has a valving structure not readily damaged, even in the event of damage to the barrel; and that can be provided with selected valve units to permit selected valving action.

Yet another object is to provide a safety wand having valving structure with extremely durable components subjected to high pressure discharge and other components of high lubricity plastics providing small diameter passages for the high pressure discharge.

FEATURES OF THE INVENTION

Principal features of the invention include a valve housing that is formed as a component part of a handle and an inlet tube cover and a break-away barrel that is threadly attached to the barrel.

The valve structure further comprises replaceable and convertible valve head and valve body inserts, each of which is slidable into the housing and with a selected valve head then being pushed by a tang of the trigger pivoted within the housing, adjacent to the handle. By-pass passages are formed in the housing and a selected valve head is positioned to allow flow through an inlet orifice in the valve body and through the by-pass passages in the valve housing. Selected valve head and valve body inserts allow a user to choose valving functions desired for the spray wand. In one valve body usable with the valve housing a port through the valve body opens into a main bore of the barrel and, when the associated valve head is seated against the valve body, flow is directed through the inlet orifice to the high pressure discharge port and through the barrel.

The barrel is threaded into the housing and the threads on the barrel and the threads within the housing formed on a common radius and are made of materials selected such that should a break-away force be applied to the barrel, the barrel threads will release from the threads in the housing, without causing permanent damage to either set of threads.

In another valve body usable with the valve housing the associated valve head is spring biased to an open position and biased closed by inlet pressure overcoming the spring pressure. The valve head is manually opened to permit a high pressure flow by actuation of the trigger and engagement of the tang on the trigger with the valve head.

This valve body is particularly suitable for persons desiring a shut-off type car wash wand. The biasing of the valve head to an open position by the spring prevents damage due to freezing since the open valve head will allow water to weep out of the valve housing.

The valve structures are provided with extremely durable components that are subjected to high pressure discharge, to thereby insure long lives for the structures. They are made to subject only small diameter passages to high pressure, thereby permitting the use of plastics as valve components that will have a long use life.

Additional features include a segmented barrel with exterior tightening ribs and a sealing lip for housing engagement that can be made to desired length. The barrel may also be provided with a metal nozzle adapter molded into the barrel and with a projecting threaded end to receive a selected nozzle and with the barrels exteriorly threaded to receive a flared nozzle protector.

Another feature is the provision of a swivel coupling, within the body of the gun, for coupling of the supply line to the spray wand.

Additional objects and features of the invention will become apparent to those skilled in the art to which the invention pertains from the following detailed description and drawings.

THE DRAWINGS

In the drawings:

FIG. 1 is a perspective view of the spray wand of the invention with a first valve assembly therein and with an attached supply hose shown fragmentarily;

FIG. 2, an enlarged vertical central section, taken on the line 2—2 of FIG. 1;

FIG. 3, an enlarged transverse cross section, taken on the line 3—3 of FIG. 1;

FIG. 4, a view like FIG. 1, but showing a spray wand with a second valve assembly therein and without the supply hose;

FIG. 5, an enlarged vertical central section, taken on the line 5—5 of FIG. 4;

FIG. 6, an enlarged fragmentary section through a barrel tip of the wand with a metal high-pressure nozzle thereon and a nozzle protector; and FIG. 7, an enlarged fragmentary vertical control section showing another embodiment of valve unit therein.

DETAILED DESCRIPTION

Referring now to the drawings:

In the illustrated preferred embodiment the spray wand of the invention is shown generally at 10. As shown, the spray wand 10 includes a handle 11 comprising a valve housing 12, and an inlet tube cover 13 with inlet tube 14 inside and connected to the handle by a trigger guard 15.

A seamless molded barrel 16 is threaded into the valve housing and an actuator trigger 17 has a tang 18 (FIG. 2) that extends into the valve housing 12 and that is pivoted by a pivot pin 19 to the housing.

The valve housing 12 includes an insert 20, made of "Delrin" (a registered trademark of Dupont Corporation) or other suitable, durable, self-lubricating material that will not cold flow. The insert 20 is molded into the same strong, somewhat resilient cover material 21, which may be "Sanaprene" (a registered trademark of Monsanto Corporation), or other such suitable thermoplastic rubber material which is abrasion resistent and flexible, yet has a comfortable feel when gripped and from which the handle 11, trigger guard 15 and inlet tube cover 13 are also formed.

Insert 20 is formed as a partial socket, is interiorly threaded at one end 20a and has a pair of spaced apart sidewalls 22 and 23 that extend into the handle 11. The pivot pin 19 extends through the sidewalls 22 and 23 and the cover material 21 and the trigger 17 hangs from the pin 19 between the sidewalls 22 and 23. The tang 18 of trigger 17 projects into the housing and when the trigger is pivoted moves from a position remote from an end 24 of a bore 25 formed through the insert 20.

Bore 25 is formed with the interior threads 20a at one end, a shoulder 27 at the other end of the threads; a stepped central section 28 extending from shoulder 27 to another shoulder 29 and a straight bore section 30. Central section 29 has a flat bottom guide surface 32 and a plurality of low pressure grooves 33 extending the length of the section and spaced around the central section from the guide surface 32. The bore section 30 is cylindrical.

The barrel 16 is formed with an outer wall 40 and with the tip end 42 of the barrel closed except for a central bore 43 that extends centrally through the space within inner wall 41 and a plurality of bores 44 that are spaced around bore opening 43 and that extend through the outer wall 40 parallel to central bore 43.

The other end of outer wall 40 has an exteriorly threaded section 45 formed as a partial ball to be threaded into the threads 20a. A tip portion 45a is also formed as a partial ball of smaller radius than the threaded section 45. Tip portion 45a seats against a similarly shaped shoulder 20b of insert 20. The other end 46 of the barrel is also closed except for the central bore opening 43 that opens into the space within inner wall 41 and the plurality of bore openings 44 spaced around opening 43 and each opening into the space between walls 40 and 41.

The barrel 16 is formed from a suitable plastic material, such as "Zytel Supertough" (a trademark of the Dupont Corporation) characterized by being very strong and elastic and the threads 20a and 45 are thus all made of plastic having spring characteristics, so that when a sufficient bending force is applied to the barrel the threads within the mating partial ball and socket components will yield as the tip portion 45a swivels inside shoulder 20b and the barrel 16 will separate from the valve housing without significant damage to the threads. Thus, the barrel can be repeatedly threaded back into the valve housing and permanent damage to the wand 10 is avoided. The barrel 16 also has a skirt 50 projecting from the outer wall 40 and concentric to a portion of the threads 45 to abut and seal with a shoulder 51 that surrounds the threaded end of insert 20, thereby preventing leakage of low pressure water from between the barrel and barrel housing.

Ribs 48 are spaced around the barrel 16 and extend from the skirt 50 partially along the barrel 16. The ribs provide decoration to the exterior appearance of the unit. In addition, the ribs provide means to be manually grasped or to be grasped by a tool in the tightening and releasing the barrel from the housing. The ribbed configuration is not readily recognized by users of the wand as being provided for tightening and releasing of the barrel and this camouflage reduces the temptation for such users to deliberately unscrew the barrel from the housing.

Barrel 16 can be formed as a single length of material or of segments bonded together to provide a nozzle of desire length.

In the embodiment of the invention shown in FIGS. 2 and 3, a conical valve seat 54 is formed around the opening 43.

A valve unit 55 is adapted to slide into the insert 20. Valve unit 55 includes a valve body 60 having a flat exterior side 61 that mates with the flat bottom guide surface 32 of bore 25. Valve body 60 conforms to the interior shape of bore 25 and fits snugly therein. A bore 63 is provided axially through the body 60 and is intercepted by a transversely extending inlet passage 64 through the flat exterior side 61. Passage 64 is aligned with the inlet tube 14 when the valve body is positioned in insert 20. An 0-ring 65 surrounds an end of passage 64 that is convex to receive the conical valve seat 54 and to provide a seal between the barrel and the valve unit 55.

A valve head 65 includes a small piston 66 with a central recess 66a that reciprocates in the other end of bore 63, a curved shoulder 67 that corresponds to a curve formed on the end of bore 64, a dished plate 68 projecting radially from the shoulder and a large piston 69 with spaced apart O-rings 70 and 71 extending therearound. The small piston 66 and large piston 69 are preferably made of "Delrin" (a trademark of Dupont Corporation) or other suitable plastics material that will readily slide. The plate 68, including the shoulder 67 is preferably made of metal to be wear resistant to water passing thereover or of an ultra-high molecular weight polymer plastic that is not subject to cold flow. The small piston 66 preferably snaps onto a head 72 attached to shoulder 67 and the large piston 69 preferably snaps onto a disk 73 formed on the plate 68. The snap connection between the plate 68 and large piston 69 provides for some degree of relative movement between the two members and allows them to function without the need for close machine tolerance between the valve unit and the insert 20. The dished plate 68 deflects low pressure water to keep solid particles out of the seal area. O-ring 70 is not a seal, but serves as a dirt barrier. When the valve head is in its forward position water by passes O-ring 70 to lubricate the O-ring 71 which does act as a seal.

Notches 78 provided in the exterior of valve body 60 are aligned with the low pressure grooves 33 in the insert 20, which, in turn are aligned with the bores 44.

In operation of the wand 10 with the valve unit 55 therein, inlet passage 64 is provided through tube 14 and inlet passage 64 acts against the small piston 66 to move the piston out of bore 63. The incoming water is then discharged through the central bore opening 47, the passage through the inner housing 41 and the central bore 43, and through the space formed between valve body 60 and plate 68, notches 78 and grooves 33 around the valve body and out the bores 44 in the barrel. The simultaneous discharge from all of the openings 43 and 44 in the barrel tip results in a low pressure discharge that is easily controlled by the user. If, however, the user squeezes trigger 17, the tang 18 thereof is pivoted to engage the large piston 69 and to force the small piston 66 into the valve body 60. This prevents flow through the notches 78 and grooves 33 and insures that all flow will be through central bore opening 47 and central bore 43 as a high pressure discharge. With the valve unit 55 in place, flow entering inlet tube 14 is discharged either as a low pressure discharge when trigger 17 is released or as a high pressure discharge when trigger 17 is pivoted.

Alternatively, the valve unit 80 shown in FIGS. 4 and 5 and a barrel 81 can be used in place of the valve unit 55 and barrel 16 respectively.

Barrel 8 is like the barrel 16 previously described except that it has a flat end 81a rather than a closed end with the conical valve seat 47. Accordingly like reference numerals are used to depict common elements of the barrels 81 and 16.

Valve unit 80 includes an O-ring 82 that surrounds the central bore opening 47 of barrel 81 and that fits around a metal ring-shaped plate 83. The plate 83 overlies and blocks flow through the bores 44.

A valve body 84 has one flat side 84a to slide on and mate with the flat bottom guide surface 32 of the bore 25 in insert 20 and is otherwise shaped to conform to the bore 25 and to abut against shoulder 27. A bore 05 opening through the flat bottom guide surface allows inlet water from the tube 14 into a bore 86 extending centrally through the valve body 84.

One end 87 of valve body 84 forms a valve seat for a valve head 88 on one end of a stem 89. When the valve head 88 is positioned in the end 87 flow is prevented between bore 86 and the central bore 43 of barrel 81.

A spring 90 fits in a bore 91 of a piston 95 at the other end of stem 89. Spring 90 biases a plug 92 against the tang 18 of trigger 19 and the valve head 88 out of the valve seat 87. A shoulder 93 is formed at the other end of stem 89 and the shoulder 93 engages an abutment 94 formed in the bore 86 and the piston 95 extends from shoulder 93 and slides in an enlarged portion of the bore 86.

The tang 18 of trigger 17 is adapted to engage the plug 92, compress spring 90, and to move the piston 95, stem 89 and valve head 88 until the valve head is moved out of valve seat 87.

In operation, inlet flow from tube 14 is initially directed through bore 43 of the barrel 81 since the valve head 88 is biased open by spring 90. The incoming water pressure also acts against shoulder 93 to move the valve head 88 into valve seat 87, against the bias of spring 90 thus shutting off flow through the barrel. Thereafter, actuation of trigger 17 will again move the valve head out of valve seat 27 and will permit high pressure flow through the barrel.

Thus, in the embodiment of FIGS. 4 and 5 the wand 10 provides a unit that will be open to allow drainage and to prevent freeze damage and that will automatically shut off flow through the barrel unless the trigger is operated to actuate such flow.

Whether valve unit 55 or valve unit 80 is selected for use the entire valve unit is accessible for replacement or repair purposes merely by removing the barrel of the wand.

Inlet tube 14 is embedded in a sleeve 98 that is of the same material surrounding the rest of the valve housing. The tube 14 is opened at one end through an aligned bore 98a into either the valve 55 or the valve 80, as previously described. The other end of tube 14 is threaded at 99 and sleeve 98 is flared to provide a skirt 100 surrounding and extending slightly beyond the threads. An insert tube 101 extends into tube 14 and is separated from tube 14 by a plastic bearing sleeve 102. Leakage past the insert tube 101 provides lubrication for rotation of the insert tube. A flange 103 on insert tube 101 engages a washer 104 at the bottom of tube 14 and is held in place by a collar 105 that is threaded onto the tube 14 and that extends into skirt 100. Insert tube 101 is threaded at end 105 to receive the usual supply line coupling 106. With the insert tube 101 mounted to rotate there is less torque applied to the hands of a user as a result of rotation of the wand during use than occurs when a swivel mounting is provided outside of the valve housing in conventional fashion.

The skirt 104 deflects any water that may leak at the coupling 106, or around the tube 101 downwardly along the inlet hose connected to the wand. Also, since the skirt surrounds and projects beyond the threads, the threads are protected and other objects and persons are protected against injury from the threads. Thus, the wand, without the insert tube 101, bearing sleeve 102, flange 103, washer 104 and collar 105 can be shipped through the U.S. Mail with shipping tag thereon and no further packaging or wrapping is required.

In a preferred form the barrel of the car wash wand 10 is fitted with a selected discharge nozzle that will give a desired spray pattern. Thus, as best shown in FIG. 6, a nozzle insert 110 is molded into and projects from the tip end of barrel 16 (or barrel 81).

The nozzle insert has a bore 111 that aligns with the central bore 43 through the barrel and a body 112 that is molded into the barrel such that it does not block flow through bores 44. Spaced apart grooves 113 and 114 encircle the nozzle insert to receive barrel material and a threaded projection 115 of smaller diameter than the body 112 extends from the tip of the barrel. The insert 110 is thus held by engagement of the body material in the grooves and in front of the body 112. The exterior surface of the barrel is knurled at 117 and the material from which the barrel is formed is molded into the grooves of the knurling to prevent twisting of the insert in the barrel. The bore 111, at the end 110a of nozzle insert 110 inside barrel 16 is flared so that the material from which the barrel is formed flows into the flared end to form a chevron seal 110b with the nozzle insert. Thus, flow through barrel 16 will act on the chevron seal 110b to prevent water seeping in behind the barrel insert and pushing of the inset from the barrel.

A conventional nozzle 118 is threaded onto the projection 115. The nozzle is selected to provide a desired spray pattern by the user.

Also in a preferred form, the barrel 16 (or 81) is formed with a collar 119 spaced slightly back from the barrel tip and the barrel is threaded at 120 from the barrel tip to the collar.

A soft plastic, flared tip cover 121 having interior threads 122 is threaded onto threads 120.

Still another embodiment of valve unit usable with the spray wand 10 is shown in FIG. 7. The valve of this embodiment is the same as that shown in FIG. 2, except that the valve body, shown as 124 is provided with a cut-away portion 126 to allow a spring 125 to be inserted around the valve body in the portion 126. The spring 125 acts between the shoulder 20b of insert 20 and a shoulder 118 at the end of cut-away portion 116.

The spring 117 lightly biases the valve body out of sealing engagement with insert 20 and insures weep flow
through the grooves 33 and bore openings 44 even during freezing temperatures.

Although a preferred form of my invention has been herein disclosed, it is to be understood that the present disclosure is by way of example and that variations are possible without departing from the subject matter coming within the scope of the following claims, which subject matter I regard as my invention.

I claim:
1. An improved spray wand comprising
   a molded barrel having an inner discharge passage and at least one outer discharge passage;
   a molded valve housing;
   a trigger pivoted into the housing;
   a molded handle extending from the housing and formed integrally therewith;
   an inlet tube opening into the housing;
   valve means in the valve housing to be engaged by the trigger;
   a protective coating of the same material from which the valve housing and handle is formed surrounding the inlet tube; and
   means coupling the barrel to the valve housing, said means including interior threads formed in said valve housing, mating threads on the barrel and a skirt member extending outwardly from the barrel and spaced therefrom into engagement with the exterior of said housing.
2. An improved spray wand as in claim 1, wherein the threads carried by the valve housing and the threads on the barrel are made of spring plastic whereby the barrel can break-away from the housing without damage to the threads.
3. An improved spray wand as in claim 2, wherein the threads carried by the valve housing are formed in a partial socket and the threads formed on the barrel are formed on a partial ball.
4. An improved spray wand as in claim 1, wherein the valve means in the valve housing to be engaged by the trigger comprises
   a housing insert with spaced grooves formed therein;
   a valve body with a central bore therethrough and a hole intersecting said central bore and aligned with the inlet tube aligned with the inner discharge passage through the barrel and notches interconnecting the central bore and the slots in the insert; and
   a valve head unit with a shaft extending through the central bore and into the inner discharge passage of the barrel, a valve head on one end of the shaft adapted to move into the central bore and to stop flow therethrough, and a piston on the other end of the shaft slidable in an enlarged portion of the central bore; and wherein the trigger has a tang thereon to engage a portion of the piston projecting from the central barrel.
5. An improved spray wand as in claim 4, further including
   a plate interconnecting the shaft and the piston of the valve unit, said plate having a curved shoulder on one face thereof to deflect water from the central bore to the spaced grooves of the insert and the outer discharge passages, and a plate on an opposite face thereof to snap together with an opening on the piston.
6. An improved spray wand as in claim 1, wherein the valve means in the valve housing to be engaged by the trigger comprises
   a housing insert fitted in the valve housing and having a bore therethrough;
   means to prevent flow through the outer discharge passage of the barrel;
   a valve body with a central bore therethrough and a valve seat at one end thereof;
   a valve head unit including a shaft extending through the central bore of the valve head and into the inner discharge passage of the barrel, spring means biasing the head beyond the central bore, a piston movable in an enlarged portion of the central bore and acted on by water from the inlet to move the valve head into the central bore to prevent flow therethrough; and wherein
   the trigger has a tang thereon to engage the piston whereby actuation of the piston will move the piston, shaft and valve head to open flow between the central chamber and the inner discharge passage through the barrel.

7. An improved spray wand as in claim 1, wherein the inlet tube is journalled in a cover for the valve housing and handle, whereby the inlet tube acts as a rotational bearing for the spray wand.

8. An improved spray wand as in claim 7, wherein the barrel is made of Zytel Supertough.

9. An improved spray wand as in claim 5, wherein the inlet tube is journalled in a cover for the valve housing and handle, whereby the inlet tube acts as a rotational bearing for the spray wand.

10. An improved spray wand as in claim 6, wherein the inlet tube is journalled in a cover for the valve housing and handle, whereby the inlet tube acts as a rotational bearing for the spray wand.

11. An improved spray wand as in claim 9, wherein the barrel is made of Zytel Supertough and the valve housing is made of Delrin.

12. An improved spray wand as in claim 10, wherein the barrel is made of Zytel Supertough and the valve housing is made of Delrin.

* * * * *